United States Patent [19]

Benson

[11] Patent Number: 5,157,358
[45] Date of Patent: Oct. 20, 1992

[54] HIGH SPEED FREQUENCY AGILE FSK MODULATOR

[75] Inventor: James A. Benson, Huntingdon Valley, Pa.

[73] Assignee: Sonex Corporation, Philadelphia, Pa.

[21] Appl. No.: 795,351

[22] Filed: Nov. 20, 1991

[51] Int. Cl.$^5$ .......................................... H04L 27/12
[52] U.S. Cl. ..................... 332/100; 331/11; 331/36 C; 331/177 V; 331/179; 332/102; 375/65
[58] Field of Search ............... 332/100, 101, 102; 331/10, 11, 36 C, 177 V, 179; 375/65, 66

[56] References Cited

U.S. PATENT DOCUMENTS

| | | | |
|---|---|---|---|
| 2,930,991 | 3/1960 | Edwards | 332/102 |
| 3,626,330 | 12/1971 | Zalonis | 375/65 |
| 3,921,102 | 11/1975 | Voorman et al. | 332/102 |
| 4,494,090 | 1/1985 | Popek et al. | 332/127 X |
| 4,567,603 | 1/1986 | Howell et al. | 375/65 |

Primary Examiner—Siegfried H. Grimm
Attorney, Agent, or Firm—Seidel, Gonda, Lavorgna & Monaco

[57] ABSTRACT

A modulation circuit that is particularly suited for a communication modem and provides for each of the channels precise carrier mark and space frequencies generated in response to external signals from an FSK communication station. The modulation circuit includes first and second frequency controlling circuits arranged with an inductor to form a resonant circuit of a voltage variable oscillator. The modulation circuit further includes a feedback control network and a voltage-frequency control adjustment circuit. The feedback control network generates a loop error signal applied to both frequency controlling circuits. The voltage-frequency control adjustment circuit generates a voltage-frequency adjustment control signal and has a switching circuit responsive to the external signals. The voltage-frequency control adjustment circuit includes an inverting network and a bias network. The inverting network receives the loop error signal and provides, when in an operative state, an output signal that is phase shifted by a predetermined amount from the loop error signal. The bias network is connected between the output of the inverting network and the second frequency controlling circuit and controls the operative and non-operative state of the inverting network. The combined operation of the inverter network and the bias network generates carrier frequencies that are shifted in response to the external signals.

17 Claims, 1 Drawing Sheet

HIGH SPEED FREQUENCY AGILE FSK MODULATOR

FIELD OF THE INVENTION

The present invention relates to a system that provides a very precise high frequency signal and then shifts such a signal, in response to an external signal, by a predetermined amount in a very accurate manner. The system is particularly suited for modems requiring very precise RF output signals, in the megahertz range, that are very accurately shifted in response to the presence (MARK) and absence (SPACE) of a frequency shift keyed (FSK) request from a communication station.

BACKGROUND OF THE INVENTION

Modems used in communication networks, such as traffic control systems, require a modulation circuit in their RF transmitter section that provides for the transmission of binary digital data (0 to about 100 kilobits per second) that are impressed on a carrier or center frequency signal in the megahertz range. Such modems may have, for example, 24 channels having actual center frequencies that vary from 30.05 MHz through 41.55 MHz each of which has a bandwidth of 100 kHz (i.e., ±50 kHz deviation), and each of which is separated from each other by 500 kHz. When used by a frequency shift keyed (FSK) transmission scheme, these center frequency signals are shifted in frequency in response to the FSK request composed of "mark" and "space" information. The mark information is commonly the intelligent part of the signal, wherein the on or 1 state is represented by a binary bit. Conversely, the space information is commonly represented by the non-presence (off or 0 state) of a binary bit. The modem, in response to the space signal shifts the carrier frequency associated with the mark signal by a predetermined frequency step, such as 100 kHz. A system that responds to the presence and absence of a FSK request is disclosed in U.S. Pat. No. 3,626,330 of Zalonis issued Dec. 7, 1971.

The modulation circuit may commonly have a single high frequency generator that includes an oscillator and which provides a very precise frequency signal for each of the channels of the modem. The use of a single precise frequency generator to provide the carrier frequency signal within an accurate bandwidth, and then shift such a carrier frequency by a discrete and accurate amount, presents certain difficulties. For example, the actual center frequency of the modem channels varying from 30.05 to 41.55 MHz represents a significant frequency span, that is, 11.5 MHz or over 38% change in frequency from channel 1 to channel 24. Using a frequency generator that varies over this relatively high range (38%) precludes the use of the same generator to provide a constant deviation bandwidth, that is 100 kHz, for each of the carrier frequencies of the modem channels. Further, the requirement of providing this large variance in the carrier frequency signals is not easily reconcilable with the requirement of shifting each of these carrier frequency signals, in response to an external signal, by a constant step in its frequency. It is desired that a single modulation circuit provide carrier frequencies that vary over a large range of the frequency spectrum, especially in the megahertz range, while at the same time provide a constant deviation bandwidth and a constant frequency shift when requested by an external source.

Accordingly, it is an object of the present invention to provide a modulation circuit for a modem that generates very precise carrier frequencies that are shifted by a constant frequency step, such as 100 kHz, in response to the signals of a frequency shift keyed (FSK) communication station, and maintain both the non-shifted and shifted carrier frequencies within a constant bandwidth, such as ±50 kHz, regardless of carrier frequency.

It is a further object of the present invention to provide such a modulation circuit that provides very precise frequency signals that are maintained within a desired bandwidth and which may be shifted, in response to an external signal, by a discrete frequency step in a substantially instantaneous manner so as to serve the needs of various communication networks.

It is a further object of the present invention to provide a circuit for controlling an oscillator that generates highly precise signals and allows such signals to be shifted by discrete frequency steps.

SUMMARY OF THE INVENTION

The present invention is directed to a modulation circuit that generates very precise high frequency carrier signals in the megahertz (mHz) range, and then shifts such signals by an accurate, constant step in frequency in response to an external signal. The modulation circuit is particularly suited for use in an RF transmitter section of a modem that generates a plurality of very precise high frequency carrier signals each serving as a channel frequencies of the modem and each of which carrier frequencies is shifted by a predetermined and discrete frequency step in response to an external signal.

The modulation circuit comprises a frequency generator, in the form of an oscillator including a resonant circuit that develops a plurality of natural response frequencies each of which corresponds to the plurality of center frequency signals of the modem. The modulation circuit further comprises a feedback control network and a voltage-frequency control adjustment means. The frequency generator has a switching means that is responsive to the external signal. The frequency generator develops a first variable output signal and a control voltage. The oscillator is responsive to the control voltage and includes an output stage having the resonant circuit.

The resonant circuit comprises an inductive element having a predetermined value and a first frequency controlling means serving as a first capacitive element and a second frequency controlling means serving as a second capacitive element. The first frequency controlling means is responsive to a loop error signal, whereas the second frequency controlling means is responsive to the loop error signal and a voltage-frequency control signal. Each of these signals vary the capacitance of the capacitive element it controls over a predetermined range. The natural resonant frequency of the resonant circuit is determined by the predetermined value of the inductive element as well as the variable value of each capacitive element and the inherent capacitance value at the output stage of the oscillator itself.

The feedback control network develops the error loop control signal in response to the first variable output signal of the frequency generator. The loop error signal is applied to both the first and second frequency controlling means. The loop error signal and the arrangement of the first and second frequency controlling means are selected so that the loop error signal causes each of the frequency controlling means to provide the same capacitance value. The loop error signal serves solely to control the first frequency control means, but only partially to control the second frequency control means, which is also controlled by the voltage-frequency control signal.

The voltage-frequency adjustment means develops the voltage-frequency control signal and comprises an inverting network and a second switching means which is also responsive to the external signal. The second switching means renders the inverting network operative or non-operative in response to the external signal. The voltage-frequency adjustment means further has means for providing a range of predetermined voltage levels applied across the second frequency controlling means. Each of the levels develops a corresponding carrier frequency of the modem, more particularly, a carrier frequency that is shifted from a prior signal by a discrete frequency step. The predetermined voltage levels are established by selecting a particular response characteristic of the inverting means as well as by selecting the values of the components of the bias network that cooperates with the inverting means. The predetermined voltage levels correspond to the frequency controlling means characteristics for changing their capacitive values in response to reverse-bias voltage applied thereacross. The bias network is connected between the output of the inverting means and the second frequency controlling means. The bias network has an impedance element that is arranged across the second switching means so as to be bypassed in response to the conductive state of the switching means, and wherein such a bypassed condition renders the inverting means non-operative. The bias network and the inverting means provide a range of voltage-frequency control signals that cause the resonant circuit to correspondingly generate each of the carrier frequencies of the modem that is shifted by a discrete frequency step in response to non-conductive state of the second switching means.

Other objects, advantages and novel features of the present invention will become apparent from the following detailed description of the invention when considered in conjunction with the accompanying drawings.

BRIEF DESCRIPTION OF THE DRAWING

For the purpose of illustrating the invention, there is shown in the drawings a form which is presently preferred; it being understood, however, that this invention is not limited to the precise arrangement and instrumentalities shown.

DETAILED DESCRIPTION OF THE INVENTION

Figure 1:
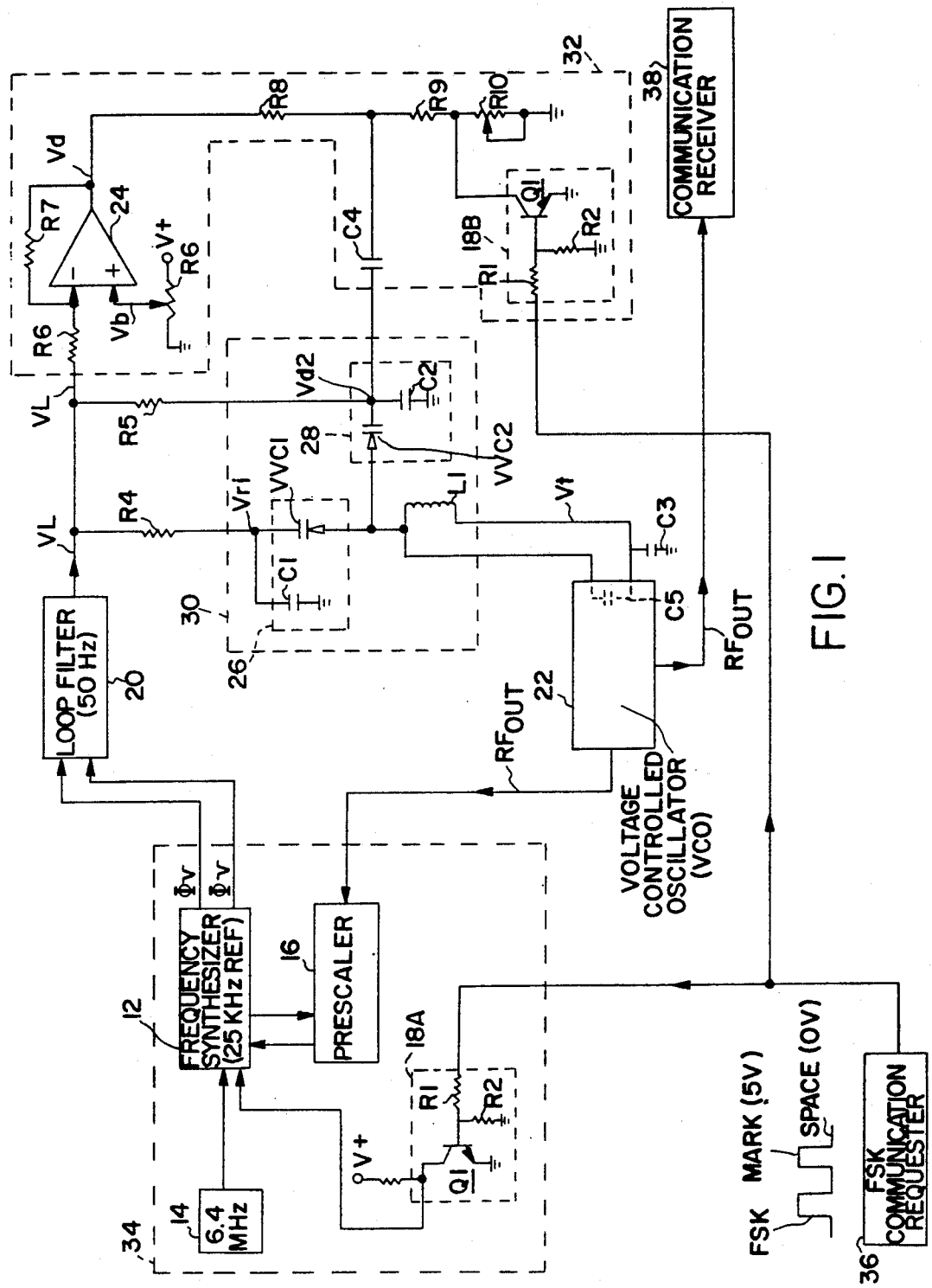
FIG. 1 is the sole schematic diagram illustrating the modulation circuit of the present invention.

In general, FIG. 1 illustrates a circuit arrangement 10 that provides an RF output signal at a very precise frequency, and which maintains such a frequency within a very precise bandwidth. The feature of the circuit arrangement 10 that is of particular importance to the present invention is its control of the reverse-bias voltage applied to the voltage variable capacitors (VVC1 and VVC2) in response to the "mark" and "space" information from a communication requestor that employs a frequency shift keyed (FSK) transmission scheme. The circuit arrangement 10 precisely shifts the carrier frequency by a discrete frequency step, such as 100 kHz in a substantially instantaneous manner without any hunting and tracking that might otherwise occur without the benefits of the present invention. All of the carrier frequency signals have a predetermined bandwidth such as 100 kHz. Further, all of the carrier frequency signals are separated from each other by a predetermined amount such as 500 kHz.

The circuit arrangement 10 comprises a plurality of elements each having a reference number and each being of a type or having a typical value for one embodiment of the present invention as given in Table 1.

TABLE 1

| Element | Nomenclature | Type |
|---|---|---|
| 12 | frequency synthesizer (available from Motorola) | MC145152 |
| 14 | frequency source (6.4 MHz) (available from M-Tron) | parallel resonant crystal |
| 16 | prescaler (available from Motorola) | MC12019 |
| 18A | first switching means (transistor switch available from Motorola) | 2N4124 |
| 18B | second switching means (transistor switch available from Motorola) | 2N4124 |
| 20 | loop filter | 50 Hz loop bandwidth frequency |
| 22 | voltage controlled oscillator (VCO) (available from Motorola) | MC 1648 |
| 24 | inverting amplifier (available from Motorola) | LM324 |
| R1 | | 10 kΩ |
| R2 | | 10 kΩ |
| R3 | | 100 kΩ |
| R4 | | 1 kΩ |
| R5 | | 100 kΩ |
| R6 | | 10 kΩ |
| R7 | | 10 kΩ |
| R8 | | 10 kΩ |
| R9 | | 10 kΩ |
| R10 | potentiometer | 5k |
| Rb | potentiometer | 20 kΩ |
| C1 | | 0.1 μf |
| C2 | | 15 pf |
| C3 | | 0.1 μf |
| C4 | | 1.5 μf |
| C5 | inherent capacitance in the output stage of oscillator 22 | 6 pf |
| L1 | | 0.5 μh |
| Q1 | transistor available from Motorola | 2N4124 |
| VVC1 | voltage variable capacitive diode (available from Motorola) | MV209 |
| VVC2 | voltage variable capacitive diode (available from Motorola) | MV209 |

The circuit arrangement 10 uses various symbols that are given in Table 2.

TABLE 2

| Symbol | Nomenclature |
|---|---|
| $V_f$ | the bias voltage present at resonant circuit 30 |
| $V_L$ | loop error voltage |
| $V_b$ | the bias voltage of inverter 24 |
| $V_d$ | output voltage of inverter 24 |
| $V_{r1}$ | reverse-bias voltage across VVC1 |
| $V_{d2}$ | reverse-bias voltage across VVC2 |
| $RF_{out}$ | RF output signal serving as the carrier frequency of modem |
| $\Phi_r$ | phase detect output signal |
| $\Phi_v$ | phase detect output signal |

The elements of circuit arrangement 10 are shown in FIG. 1, where applicable, as comprising various functional devices serving as circuit means for the present invention as given in Table 3.

TABLE 3

| Element | Subsystem |
|---------|-----------|
| 18A | first switching means comprising R1, R2 and Q1 |
| 18B | second switching means comprising R1, R2 and Q1 |
| 26 | first frequency controlling means comprising VVC1 and C1 |
| 28 | second frequency controlling means comprising VVC2 and C2 |
| 30 | resonant circuit comprising first frequency controlling means 26, second frequency controlling means 28, first inductive means L1, and (although not shown) the capacitor C5 |
| 32 | voltage-frequency adjustment means comprising inverting means 24 having its network elements R6, R7 and Rb; a bias network having impedance components R8, R9, R10 and C4; and swithing means 18B effectively connected across R10 |
| 34 | frequency generator comprising frequency synthesizer 12, frequency source 14, prescaler 16, and swithing means 18A |

As previously mentioned, an important feature of the circuit arrangement 10 is the control of the VVC1 and VVC2 elements so that each has a very precise capacitance quantity having a value typically carried out to the fifth digit. The voltage variable capacitor diodes (VVC1 and VVC2) are each shown in FIG. 1 by means of a symbol represented at one end by an anode of a diode and at the other end by capacitive plates so as to suggest its variable capacitive capability. In actuality, these capacitive plates represent the cathode of the voltage variable capacitor diode.

Each of the voltage variable capacitance diodes (VVC1 and VVC2) has a capacitance value that varies almost linearly when plotted on a log voltage scale versus a linear capacitance scale. This linearity response is an important feature of the present invention and is advantageously used to obtain precise capacitive values for each of VVC1 and VVC2 which, in turn, causes very accurate frequency signals to be generated by the circuit arrangement of FIG. 1. The two diodes VVC1 and VVC2, being of the MV209 type for the embodiment of FIG. 1, provide typical capacitive values of approximately 34 pf when a 2 volt reverse bias is applied thereacross, and approximately 11 pf when a 10 volt reverse bias is applied thereacross. These reverse bias values need to take into account the bias voltage $V_t$ present in the resonant circuit and having a value of about +1.6 volts.

As shown in FIG. 1, VVC1 is arranged in series with a first fixed capacitor C1 having one end connected to a signal ground. The capacitor C1 has a value of 0.1 $\mu f$ and combines with VVC1 to form element 26. The total capacitance ($C_{26}$) of the combination of VVC1 and C1 is effectively the value of VVC1 by itself.

As also seen in FIG. 1, VVC2 is arranged in series with a second fixed capacitor C2 that is connected to a signal ground. The combination of VVC1 and C2 forms element 28. Unlike C1, the value of C2 is only 15 pf and C2 makes a substantial contribution to the total capacitance ($C_{28}$) of element 28. The total capacitance $C_{28}$ is determined by the product divided by the sum of the two capacitance values within element 26 and may be expressed as follows:

$$C_{28} = \frac{(VVC_2)(15pf)}{[(VVC_2) + (15pf)]} \quad (1)$$

The capacitive values VVC1 and $C_{28}$, and the capacitance (C5) at the output stage of the oscillator combine to form the total capacitance $C_t$ of the resonant circuit 30. The total capacitance $C_t$ may be expressed as:

$$C_t = C_5 + VVC1 + \left( \frac{(VVC_2)(15pf)}{[(VVC_2) + (15pf)]} \right) \quad (2)$$

The total capacitance $C_t$ is combined with the inductive element L1 to determine the natural resonant frequency of the resonant circuit 30 which, in turn, determines the frequency of the $RF_{out}$ signal of oscillator 22.

The circuit arrangement 10 provides a modulation circuit that is particularly suited to serve as the RF transmission section of a modem that generates a plurality of very precise frequency signals each serving as a channel frequency of the modem and each having a predetermined bandwidth. Each of the modem channels typically has two carrier frequencies that are shifted from each other by a discrete frequency step. The precise frequency signals are generated by the frequency generator 34.

The frequency generator 34 has the frequency synthesizer 12 that is, in part, responsible for generating highly precise signals over the frequency band covered by the carrier frequencies of the channels of the modem. The frequency synthesizer 12 develops an output signal, in the form of phase detect output signals $\Phi_r$ and $\Phi_u$, both related to the phase locked loop method of operating the synthesizer 12, and both of which are routed to the loop filter 20. The frequency synthesizer 12 has applied to it as an input a signal from a high frequency source 14 that provides a highly precise signal corresponding, for example, to 6.4 MHz. The frequency synthesizer 12 operates with a selected frequency reference (25 kHz) which is derived (6.4 MHz/256) from source 14. The frequency synthesizer 12 also operates with another 25 kHz signal developed in cooperation with the prescaler 16. The frequency synthesizer 12 further responds to the (ON-OFF) switching state of switching means 18A which generates a toggle-type input to synthesizer 12. The frequency synthesizer 12 in cooperation with a prescaler 16 responds to the toggle input by shifting the frequency of generator 34 by a predetermined amount, for example, 100 kHz. The frequency synthesizer 12 also accepts parallel inputs from the prescaler 16 and operates under a phased locked loop (PLL) method of control.

In general, the frequency synthesizer 12, having an operating frequency reference of 25 kHz, compares the signal from source 14 (6.4 MHz/256=25 kHz), against the signal supplied from the prescaler 16 that is divided in accordance with the desired frequency $RF_{out}$ being generated by the voltage controlled oscillator (VCO) 22. For example, when a carrier frequency of 30 MHz is generated, the frequency synthesizer 12 generates the phase detect output signals ($\Phi_r$ and $\Phi_u$) which are applied to the loop filter 20 which, in turn, generates loop error signal $V_L$ that commands the voltage controlled oscillator to generate the 30 MHz signal. This 30 MHz signal is applied to the prescaler 16 which, in turn, divides such by a preset amount (20/21); e.g., 30

MHz/20=1.5 MHz. This 1.5 MHz signal is divided within frequency synthesizer 12 by a preset amount; e.g., 1.5 MHz/60=25 kHz. For this example, the total amount divided by the cooperative operation of the synthesizer and prescaler is (20)(60)=1200. The signal (25 kHz) derived from prescaler 16 is compared, by means of a differential comparator, against the signal derived from source 14 (6.4 MHz/236=25 kHz). If these signals (25 kHz from 14 and 25 kHz from 16) are different, the frequency synthesizer 14 generates appropriate signals ($\Phi_r$ and $\Phi_v$) that are continued to be applied to loop filter 20 until the difference is zero, and the desired frequency or 30 MHz is attained.

The frequency synthesizer 12, in cooperation with the prescaler 16, responds to the toggle input from switching means 18A by increasing the desired frequency in a stepped amount, such as 100 kHz. The frequency synthesizer 12 disclosed with reference Table 1 includes a (divide-by) 4 bit (A) register. This 4 bit device cooperates with the prescaler 16 such as to generate the stepped frequency. This four bit quantity is additive to the total amount being preformed by the dividing operation accomplished by the combined operation of the synthesizer and scaler 16 so that a 25 kHz operation reference frequency of synthesizer 14 is maintained in spite of any increased frequency output of oscillator 22. For example, when it is desired to increase the frequency from 30.0 MHz (mark) to a space frequency of 30.1 MHz, the 30.1 MHz signal, (developed by the cooperation between the synthesizer 12, loop filter 20 and oscillator 22), is divided by the cooperative action of the synthesizer 12 and prescaler 16 by a total amount of 1204. The total of 1204 is the previous sum (1200) derived for the 25 kHz reference, plus the 4 bits of the A register so that the (30.1 MHz/1204) 25 kHz reference operating frequency is maintained for the synthesizer 12.

The bandwidth or response frequency of phase locked loop (PLL) of synthesizer 12 is determined by the frequency response selected for the loop filter 20. In one embodiment, the response frequency of filter 20 is selected to be relatively slow, such as 50 Hz, and which is proportional (1/500) to the 25 kHz reference frequency synthesizer 12. This relatively slow response of the filter 20 controls the PLL operation of the synthesizer 12 and allows the capacitive values of VVC1 to remain virtually constant during the transition from mark to space frequencies.

The circuit arrangement 10, in one embodiment, establishes the mark and space frequencies in response to the frequency shift keyed (FSK) communication requester 36 generating the mark and space information having the typical values of 5 volts and 0 volts, respectively, as shown in FIG. 1.

The modulation circuit 10 provides for the transmission of binary digital data at a rate of 0 (i.e., dc response for a constant mark or space signals) through 57,600 bits per second. This dc response is sometimes called for in the operation of modems such as those of the present invention particularly suited for use in traffic control systems. Normally, the binary digital data is impressed on the carrier frequency signals ($RF_{out}$) of modulation circuit 10. The $RF_{out}$ signals are routed to a communication receiver 38. The upper limit is not restricted to 57.6 kilobits, but represents the desired data rate for a modem finding use in a traffic control system. It is contemplated that the present invention, having an embodiment shown in FIG. 1, may provide a modem having a data rate beyond the 150 kilobits per second even without any changes in any of the components values or types given in Table 1.

In addition to providing the actual carrier frequency having the binary digital data impressed thereon, the circuitry of FIG. 1 also includes a compensation network (primarily element 32) to provide a constant deviation bandwidth of the RF transmitter section over all of the modem's operating channels. As previously discussed in the "Background" section, a typical modem may employ 24 operating channels each having two operating frequencies separated from each other by a predetermined frequency step, such as 100 kHz. All of the channels are provided within a bandwidth of 100 kHz (i.e., ±50 kHz deviation), and each of the operating channels is separated from the others by 500 kHz. The actual center frequencies may vary from 30.05 MHz through 41.55 MHz. This represents a significant frequency span (11.5 MHz or over 38% change from channel 1 to channel 24) that is maintained, by the benefits of the present invention, at a constant deviation bandwidth. This significant frequency span and constant deviation is provided by a single oscillator that not only yields constant carrier frequencies for each modem channel, but shifts such carrier frequencies in each channel by the same amount in response to the mark and space information requested by the FSK transmission scheme.

The circuit arrangement of FIG. 1 provides a first predetermined frequency in response to the presence of the mark signal, and a second predetermined frequency that is shifted, in an increasing manner, by a predetermined amount in response to the space information. The mark and space frequencies for a modem having channels 1–24 are shown in the first two columns of Table 4 which tabulates the modem channel vs. resonant circuit parameters.

TABLE 4

| Modem Channel | | Freq. MHz | $C_t$ (pf) | VVC1 (pf) | VVC2 (pf) | $V_{r1}$ (volts) | $V_{d2}$ (volts) |
|---|---|---|---|---|---|---|---|
| 1 | mark | 30.00 | 56.28955 | 39.42377 | 39.42377 | 1.36873 | 1.36873 |
|   | space | 30.10 | 55.91615 | 39.42377 | 34.92593 |   | 1.87625 |
| 2 | mark | 30.50 | 54.45912 | 37.72643 | 37.72643 | 1.54132 | 1.54132 |
|   | space | 30.60 | 54.10375 | 37.72643 | 33.67317 |   | 2.04670 |
| 3 | mark | 31.00 | 52.71654 | 36.11811 | 36.11811 | 1.72489 | 1.72489 |
|   | space | 31.10 | 52.37807 | 36.11811 | 32.46796 |   | 2.22677 |
| 4 | mark | 31.50 | 51.05628 | 34.59319 | 34.59319 | 1.19910 | 1.91910 |
|   | space | 31.60 | 50.73365 | 34.59319 | 31.30065 |   | 2.41627 |
| 5 | mark | 32.00 | 49.47323 | 33.14647 | 33.14647 | 2.12353 | 2.12353 |
|   | space | 32.10 | 49.16547 | 33.14647 | 30.17162 |   | 2.61488 |
| 6 | mark | 32.50 | 47.96269 | 31.77314 | 31.77314 | 2.33770 | 2.33770 |
|   | space | 32.60 | 47.66889 | 31.77314 | 29.08090 |   | 2.82225 |
| 7 | mark | 33.00 | 46.52029 | 30.46874 | 30.46874 | 2.56109 | 2.56109 |

TABLE 4-continued
Modem Channel vs. Resonant Circuit 30 Parameters

| Modem Channel | | Freq. MHz | $C_t$ (pf) | VVC1 (pf) | VVC2 (pf) | $V_{r1}$ (volts) | $V_{d2}$ (volts) |
|---|---|---|---|---|---|---|---|
| | space | 33.10 | 46.23962 | 30.46874 | 28.02827 | | 3.03794 |
| 8 | mark | 33.50 | 45.14198 | 29.22913 | 29.22913 | 2.79313 | 2.79313 |
| | space | 33.60 | 44.87368 | 29.22913 | 27.01130 | | 3.26153 |
| 9 | mark | 34.00 | 43.82404 | 28.05047 | 28.05047 | 3.03323 | 3.03323 |
| | space | 34.10 | 43.56739 | 28.05047 | 26.03533 | | 3.49251 |
| 10 | mark | 34.50 | 42.56298 | 26.92918 | 26.92918 | 3.28078 | 3.28708 |
| | space | 34.60 | 42.31731 | 26.92918 | 25.09362 | | 3.73037 |
| 11 | mark | 35.00 | 41.35559 | 25.86193 | 25.86193 | 3.53514 | 3.53514 |
| | space | 35.10 | 41.12028 | 25.86193 | 24.18730 | | 3.97458 |
| 12 | mark | 35.50 | 40.19884 | 24.84563 | 24.84563 | 3.79566 | 3.79566 |
| | space | 35.60 | 39.97332 | 24.84563 | 23.31541 | | 4.22459 |
| 13 | mark | 36.00 | 39.08996 | 23.87739 | 23.87739 | 4.06171 | 4.06171 |
| | space | 36.10 | 38.87370 | 23.87739 | 22.47695 | | 4.47984 |
| 14 | mark | 36.50 | 38.02634 | 22.95449 | 22.95449 | 4.33263 | 4.33263 |
| | space | 36.60 | 37.81883 | 22.95449 | 21.67086 | | 4.73976 |
| 15 | mark | 37.00 | 37.00555 | 22.07442 | 22.07442 | 4.60780 | 4.60780 |
| | space | 37.10 | 36.80632 | 22.07442 | 20.89607 | | 5.00379 |
| 16 | mark | 37.50 | 36.02531 | 31.23481 | 21.23481 | 4.88659 | 4.88659 |
| | space | 37.60 | 35.83394 | 21.23481 | 20.15148 | | 5.27137 |
| 17 | mark | 38.00 | 35.08351 | 20.43345 | 20.43345 | 5.16840 | 5.16840 |
| | space | 38.10 | 34.89959 | 20.43345 | 19.43602 | | 5.54196 |
| 18 | mark | 38.50 | 34.17817 | 19.66826 | 19.66826 | 5.45264 | 5.45264 |
| | space | 38.60 | 34.00131 | 19.66826 | 18.74858 | | 5.81503 |
| 19 | mark | 39.00 | 33.30742 | 18.93730 | 18.93730 | 5.73876 | 5.73876 |
| | space | 39.10 | 33.13727 | 18.93730 | 18.08811 | | 6.09005 |
| 20 | mark | 39.50 | 32.46953 | 18.23874 | 18.23874 | 6.02621 | 6.02621 |
| | space | 39.60 | 32.30575 | 18.23874 | 17.45353 | | 6.36654 |
| 21 | mark | 40.00 | 31.66287 | 17.57088 | 17.57088 | 6.31448 | 6.31448 |
| | space | 40.10 | 31.50515 | 17.57088 | 16.84383 | | 6.64400 |
| 22 | mark | 40.50 | 30.88590 | 16.93210 | 16.93210 | 6.60310 | 6.60310 |
| | space | 40.60 | 30.73394 | 16.93210 | 16.25800 | | 6.92199 |
| 23 | mark | 41.00 | 30.13718 | 16.32088 | 16.32088 | 6.89160 | 6.89160 |
| | space | 41.10 | 29.99070 | 16.32088 | 15.69502 | | 7.20008 |
| 24 | mark | 41.50 | 29.41535 | 15.73581 | 15.73581 | 7.17956 | 7.17956 |
| | space | 41.60 | 29.27410 | 15.73581 | 15.15398 | | 7.47786 |

The remaining five columns of Table 4 tabulate the $C_t$, VVC1, VVC2, $V_{r1}$, and $V_{d2}$ quantities associated with the mark and space carrier frequencies of modem channels 1-24. The quantity $C_t$ has been previously discussed and, when combined with L1, determines the natural resonant frequencies of the resonant circuit 30 which, in turn, corresponds to the carrier frequency signal of both the mark and space frequencies of modem channels 1-24. The quantities VVC1 and VVC2, given in picofarads, correspond to the respective capacitance values of these elements. The quantities given for $V_{r1}$ correspond to the reverse-bias voltage applied across VVC1, and similarly, the quantities given for $V_{d2}$ correspond to the reverse-bias voltage applied across VVC2.

From Table 4, it is seen that the quantities $C_t$, VVC1 and VVC2 are very precise quantities having values that are carried out to the fifth digit. Further, from Table 4 it is seen that the quantities VVC1 and VVC2 for each of the mark frequencies for all of the channels are identical. Similarly, the quantities for VVC1 for both the mark and space frequencies for each of the modem channels are identical. Further, the quantities $V_{r1}$ and $V_{d2}$ for each of the mark frequencies for each of the modem channels are identical. However, it is seen that the quantity VVC2 for the mark and space frequencies are different for each of the modem channels. Similarly, the quantities $V_{d2}$ for each of the mark and space frequencies within any channel are different. The operation of the circuit arrangement of FIG. 1 that produces the quantities shown in Table 4 may be described by first describing the generation of the mark carrier frequencies, and then describing the operation for the generation of the space carrier frequencies.

The circuit arrangement 10 of FIG. 1, in particular switching means 18A, is rendered conductive by the presence of the 5 volt voltage representative of the mark signal which, in turn, transfers a signal level to the frequency synthesizer 12 to signify the occurrence of the mark signal from the FSK communication system 36. The frequency synthesizer 12, in cooperation with the prescaler 16, develops an appropriate control voltage ($C_v$) that is applied to the oscillator 22. The frequency synthesizer also develops the phase detect output signals $\Phi_r$ and $\Phi_v$ which serve as the first variable output signal of frequency generator 32. The first variable output signal ($\Phi_r$ and $\Phi_v$) of frequency generator 32 is routed to the loop filter 20 to control the exact values of the desired mark frequencies shown in Table 4.

Further, the presence of the 5 volt mark level also renders conductive switching means 18B arranged across resistor R10. The conductive condition of switching means 18B bypasses resistor R10 and effectively removes R10 from the other circuit components of element 32. The other components R8, C4, R9, and the components $R_b$, R6, R7 that control the response characteristic of inverter means 24, are all selected to have values so as to inhibit any output signal $V_d$ from being generated by inverting means 24 during the bypass condition of R10. When $V_d$ is of a zero value (inverter 24 inhibited), it does not make any contribution to the reverse-bias voltage of VVC2. In this condition, the reverse-bias voltages for each of the elements VVC1 and VVC2 are identical and are solely controlled by the loop error signal $V_L$ generated by the loop filter 20.

In the operation of circuit arrangement 10 during the presence of the mark signal, the loop filter 20 generates the loop error signal $V_L$ having the values, given in Table 4, of the quantities $V_{r1}$ and $V_{d2}$ for each of the mark frequencies of each of the modem channels 1-24. None of the elements of the voltage-frequency adjustment means 32 make any contribution to any of quantities $V_{ri}$ and $V_{d2}$ for these mark frequencies.

When the mark signal is removed and the space signal (0 volts) becomes present, switching means 18A and 18B are both rendered non-conductive which, in turn, is recognized by frequency synthesizer 12 and causes the removal of the bypass condition of resistive element R10. As previously discussed, the switching means 18A now generates the toggle-input to the frequency synthesizer 12 (A register (4 bits)), which, in turn, increases the generated frequency; i.e., from 30.0 MHz to 30.01 MHz, while still maintaining its 25 kHz (30.1 MHz/1204) reference operation. Simultaneously, the re-insertion of resistive element R10 renders operative the voltage-frequency adjustment means 32, in particular the inverter means 24. The operative inverter means 24 provides an output signal $V_d$ which is developed from its received loop error voltage signal $V_L$. The output signal $V_d$ is phase-shifted by a predetermined amount from the $V_L$ signal. The element 24 is preferably a unity gain inverting amplifier and provides a predetermined phase shift, preferably 180°, between its input and output signals. The output signal $V_d$ is applied to the three resistors R8, R9 and R10 arranged in series with the junction of R8 and R9 having connected thereto one end of capacitor C4 which, in turn, has its other end connected to the cathode of VVC2. The voltage $V_d$ is coupled to the cathode of VVC2 by way of the resistive-capacitor network of element 32 (now including element R10) and combines with the loop error voltage $V_L$ to become $V_{d2}$. The quantity $V_{d2}$ has a particular and accurate value for each space frequency of each of the channel 1-24 shown in Table 4. Such an operation increases the reverse bias-voltage on VVC2 thereby decreasing the capacitive values of VVC2 given in picofarads, as shown in Table 4 which, in turn, decreases the picofarad values of $C_t$, as shown in Table 4. The decreasing values of $C_t$ correspondingly cause the increase (relative to the previously generated mark signals) by the space frequencies values for the modem channels 1-24, as also shown in Table 4.

The simultaneous and substantially instantaneous operation of the frequency synthesizer commanding oscillator 22 to generate the 30.1 MHz carrier frequency, and the voltage-frequency adjustment means 32 controlling the precise capacitance values, eliminates the otherwise normally occurring hunting and tracking operation commonly found in other frequency synthesizer methods of operation.

The voltage-frequency adjustment means 32 provides predetermined voltage levels corresponding to the variation in the voltage-capacitance characteristic of the elements VVC1 and VVC2 of the frequency controlling means 26 and 28. The predetermined voltage levels vary the capacitance values of VVC1 and VVC2 in a linear manner. The voltage levels vs. capacitance changes vary in a linear manner as a function of the log voltage of the levels vs. the increased capacitance values.

The operation of the circuit arrangement 10 to provide for the increased space frequencies was evaluated and the results of such an evaluation are given in Table 5.

TABLE 5

Test Results of Modem (Space Frequency) Channel vs. Increased Reverse-Bia Voltage to VVC2 Yielding Discrete Frequency Stes of 100 kHz

| Modem Channel | Space Freq. | ΔV ideal | ΔV actual | ΔV error |
|---|---|---|---|---|
| 1 | 30.10 | .507528 | .507618 | +.00009 |
| 2 | 30.60 | .505384 | .501401 | −.00398 |
| 3 | 31.10 | .501878 | .494788 | −.00709 |
| 4 | 31.60 | .497166 | .487792 | −.00937 |
| 5 | 32.10 | .491353 | .480428 | −.01093 |
| 6 | 32.60 | .484547 | .472713 | −.01183 |
| 7 | 33.10 | .476859 | .464667 | −.01219 |
| 8 | 33.60 | .468400 | .456308 | −.01209 |
| 9 | 34.10 | .459276 | .447654 | −.01162 |
| 10 | 34.60 | .449592 | .438742 | −.01085 |
| 11 | 35.10 | .439446 | .429579 | −.00987 |
| 12 | 35.60 | .428931 | .420195 | −.00874 |
| 13 | 36.10 | .418131 | .410611 | −.00752 |
| 14 | 36.60 | .407127 | .400852 | −.00628 |
| 15 | 37.10 | .395989 | .390940 | −.00505 |
| 16 | 37.60 | .384783 | .380898 | −.00389 |
| 17 | 38.10 | .373566 | .370746 | −.00282 |
| 18 | 38.60 | .362390 | .360507 | −.00188 |
| 19 | 39.10 | .351299 | .350201 | −.00110 |
| 20 | 39.60 | .340332 | .339847 | −.00049 |
| 21 | 40.10 | .329522 | .329462 | −.00006 |
| 22 | 40.60 | .318898 | .319066 | +.00017 |
| 23 | 41.10 | .308089 | .038673 | +.00058 |
| 24 | 41.60 | .298298 | .298300 | .00000 |

The first two columns of Table 5 respectively show the modem channel and its associated space frequency. The remaining three columns respectively show the quantities ΔV ideal, ΔV actual, and ΔV error. The ΔV ideal represents the different between the quantities of $V_{d2}$, shown in Table 4, respectively associated with the mark and space frequencies. For example, the ΔV ideal for modem channel 1 of Table 5 has a value of 0.507528 which is the difference between the $V_{d2}$ quantity for the mark frequency and the $V_{d2}$ quantity for the space frequency of channel 1 as shown in Table 4. The ΔV actual is the actual value between these two different $V_{d2}$ quantities that was developed by the circuit arrangement 10 of FIG. 1 in its obtainment of the space frequency (e.g., 30.10 MHz modem channel 1) in response to simulated conditions. The quantity ΔV error of Table 5 is the positive (+) or negative (−) difference between the quantities ΔV ideal and ΔV actual of Table 5.

From the results of Table 5, it is seen that the greatest variation (ΔV error) occurred for channel 8 of the modem and exhibited a 12.09 millivolt error. This is the largest variation for any of the channels between ΔV ideal and ΔV actual and represents a 2.58% decrease in the deviation bandwidth of the carrier frequencies of modem channels 1-24. This 2.58% deviation correlates to a ±48.7 kHz variation [(100%−2.58%)(50 kHz)]. For all practical purposes, the deviation bandwidth, derived from the quantities shown in Table 5, remains virtually constant for all of the 24 modem channels.

As can be seen from Table 5, the deviation bandwidth, without the benefits of the compensating circuit 32 of the present invention, would represent an undesired frequency deviation of 170 kHz. More particularly, using the ΔV actual value of modem channel 1 of 0.5076, and the ΔV actual value of 0.2983 of modem channel 24, and subtracting these ΔV actual values from each other would yield an amount of 0.2093 volts. If now knowing that 0.2983 volts is required for 100 kHz deviation for modem channel 24 (see Table 5), then the "deviation sensitivity" for channel 24 is 0.2983/100 kHz or 2.983 millivolts per kHz. The additional 0.20983 volts (excess because channel 1 requires 0.5076 while channel 24 needs only 0.2983) would increase the total sensitivity by (0.2093/0.002983)(1 kHz) or 70.164 kHz. The overall effect would be to provide a frequency deviation of 100 (yielded by 0.2983)+70.164 (yielded by the excess 0.2093) kHz or substantially 170 kHz which obviously is an undesirable condition.

The circuit arrangement 10 of FIG. 1 illustrates the resistor R10 as being a potentiometer. The value of this resistance must be very precise so as to match the precise values of the circuit elements VVC1 and VVC2 shown in Table 4 that yields the results of the mark and space frequencies of Tables 4 and 5. For the embodiment shown in FIG. 1 the resistor has a value of 1552.74 Ω. A potentiometer enables precise adjustment of the resistance of R10 to the required value.

It should now be appreciated that the present invention provides for a modulating circuit that yields very precise mark and space carrier frequencies. The space carrier frequency is substantially instantaneously generated because of the simultaneous operation of the frequency synthesizer and voltage-frequency adjustment means. If desired, this instantaneous generation could be also be accomplished for the mark frequencies. The present invention also provides for very precise control of the frequency controlling means VVC1 and VVC2 which, in turn, provides for very precise capacitance values that are used to determine the natural resonant frequency of resonant circuit 30.

Although the circuit arrangement 10 utilized a switching means 18B to bypass resistor RIO which, in turn, rendered non-operative the inverting means 24, it should be realized that the switching means may be placed in other circuit locations, for example, at the input stage of the inverting means 24 so as to render the inverting means non-operative by removing the loop error signal $V_L$ from the inverting means in response to the external signal "mark" generated by the frequency shifted keyed transmission scheme.

It should be further appreciated that the present invention provides very precise frequencies that may be used in other applications also having the need for developing very precise high frequency signals, and then causing these very precise frequency signals to be stepped by a discrete frequency amount corresponding to a desired new carrier frequency.

It should also be appreciated that the present invention provides for precise control of the voltage variable capacitance diodes VVC1 and VVC2 having a capacitance variable characteristic that correlates to a linear log variable function. This log variable function is provided by the frequency response characteristic of the inverter means 24 and the remaining resistor-capacitor values selected for element 32. If desired, the response characteristic of element 32 may be selected to correspond to frequency variable devices other than the voltage variable capacitive diodes VVC1 and VVC2. All that is needed is that the impedance value obtained, e.g., VVC1 and VVC2, be a very precise quantity.

The present invention may be embodied in other specific forms without departing from the spirit or essential attributes thereof and, accordingly, reference should be made to the appended claims, rather than to the foregoing specification, as indicating the scope of the invention.

What is claimed is:

1. A modulation circuit for generating a plurality of frequencies corresponding to the carrier frequencies of a plurality of channels, each carrier frequency having a predetermined bandwidth and being shifted by a discrete frequency step in response to an applied external signal, said modulation circuit comprising:
    (a) a frequency generator having a first switching means responsive to said external signal, said frequency generator generating a first variable output signal;
    (b) an oscillator responsive to said frequency generator and including a resonant circuit comprising:
        (i) an inductive element having a predetermined value;
        (ii) a first frequency controlling means comprising a first capacitive element and responsive to a loop error signal for varying its capacitance value over a predetermined range;
        (iii) a second frequency controlling means comprising as a second capacitive element and responsive to both said loop-error signal and a voltage-frequency adjustment control signal for varying its capacitance value over a predetermined range;
    said resonant circuit having a total capacitance value which is the sum of an inherent capacitance of the output stage of the oscillator and said first capacitive element capacitance value as well as said second capacitive element capacitance value, said resonant circuit having a plurality of natural response frequencies corresponding to the plurality of the carrier frequencies of said channels, said natural response frequencies being determined by said total capacitance value and said inductive element;
    (c) a feedback control network responsive to said first variable output signal and generating said loop error signal, said loop error signal being routed to said first and second frequency controlling means, said loop error signal serving solely to control said first frequency controlling means and only partially to control said second frequency controlling means; and
    (d) voltage-frequency control adjustment means developing said voltage-frequency adjustment control signal and having a second switching means with a conductive and non-conductive state responsive to said external signal, said voltage-frequency control adjustment means comprising:
        (i) an inverting network receiving said loop error signal and providing, when in an operative state, an output signal that is phase shifted by a predetermined amount from said loop error signal; and
        (ii) a bias network connected between the output of said inverting network and the second frequency controlling means, said bias network controlling the operative and non-operative state of said inverting network, said bias network having an impedance element arranged across said second switching means, said impedance element and said bias network having selected values so that said inverting network is rendered non-operative during the conductive state of said second switching means, said bias network, said impedance element and said inverting means further having values selected so that said second frequency controlling means is supplied with a range of said voltage-frequency adjustment control signals for causing the resonant circuit to generate a carrier frequency that is shifted in frequency in response to said external signal.

2. A circuit according to claim 1 wherein said frequency generator comprises:
(a) a frequency synthesizer having a predetermined frequency reference and developing phase detect output signals comprising said variable output signal, said frequency synthesizer having a phase locked loop method of operation and providing highly precise frequency signals;
(b) a highly precise frequency source that is applied to said frequency synthesizer;
(c) a prescaler cooperating with said frequency synthesizer to establish the highly accurate signals generated by said frequency synthesizer; and
(d) a transistorized device serving as said switching means and being responsive to said external signal, said external signal providing mark and space quantities from a frequency shift keyed (FSK) transmission scheme that are representative of a desired data rate of said modem, in terms of bits per second, that is impressed on each of said carrier frequencies, said switching means generating a signal corresponding to said mark and space signals that is applied to said frequency synthesizer which in response thereto generates a first predetermined frequency signal in response to said mark signal.

3. A circuit according to claim 1 wherein said oscillator comprises a voltage controlled oscillator (VCO) and has an inherent capacitance of 6 picofarads in its output stage.

4. A circuit arrangement according to claim 1 wherein said first and second frequency controlling means include a voltage variable capacitance diode having an anode and a cathode, and in which the capacitance values vary in a linear manner in response to reverse-bias voltages having a log-type characteristic.

5. A circuit arrangement according to claim 2 wherein said feedback control network comprises a loop filter having a predetermined frequency response that is proportional to said predetermined reference of said frequency synthesizer.

6. A circuit according to claim 4 wherein said first frequency controlling means further comprises a first fixed capacitor and said second frequency controlling means further comprises a second fixed capacitor, said first fixed capacitor having a capacitance value that is substantially greater than said second fixed capacitor capacitance value.

7. A circuit according to claim 6 wherein said range of said voltage-frequency adjustment control signals varies in a linear manner as a log-type function and correlate to the linear capacitance variation of voltage variable capacitance diodes having reverse-bias voltages applied to the cathodes of the voltage variable diodes.

8. A circuit according to claim 6 wherein said first fixed capacitor has a value of about 0.1 microfarads and said second fixed capacitor has a value of about 15 picofarads.

9. A circuit according to claim 1 wherein said inverting network is an inverting amplifier having a unity gain and wherein said predetermined phase shift is 180°.

10. A circuit according to claim 4 wherein said bias network for supplying said range of voltage-frequency adjustment control signals comprises:
(a) series-connected first, second and third resistors, with the third resistor serving as said impedance element and having one end connected to circuit ground, said first and second resistors having a common node to which is connected one end of a capacitor which, in turn, has its other end connected to the cathode of said second frequency controlling means, said second and third resistors having a common node to which is connected said switching means, whereby said switching means, when in its conductive state, bypasses said third resistor.

11. A circuit according to claim 4 wherein one side of said inductor is connected to the anodes of both of said first and second frequency controlling means and the other side of said inductor is connected to circuit ground through a capacitor having a value of 0.1 microfarads.

12. A modulation circuit for generating a plurality of first and second carrier frequency signals with the second carrier signal being shifted by a predetermined step in frequency from said first carrier signal in response to an external signal, each of the carrier frequency signals having a predetermined bandwidth, said modulation circuit comprising:
(a) a frequency generator having a first switching means responsive to said external signal, said frequency generator generating a first variable output signal;
(b) an oscillator responsive to said frequency generator and including a resonant circuit comprising:
  (i) an inductive element having a predetermined value;
  (ii) a first frequency controlling means comprising a first capacitive element and responsive to a loop error signal for varying its capacitive value over a predetermined range;
  (iii) a second frequency controlling means serving as a second capacitive element and responsive to both said loop error signal and to a voltage-frequency adjustment control signal for varying its capacitance value over a predetermined range;
  said resonant circuit having a total capacitance value which is the sum of the inherent capacitance of the output stage of the oscillator and said first variable capacitive element capacitance value and said second capacitive element capacitance value, said resonant circuit having a plurality of natural response frequencies corresponding to said plurality of first and second carrier frequency signals, said natural response frequencies being determined by said total capacitance value and said inductive element;
(c) a feedback control network responsive to said first variable output signal and developing said loop error signal, said loop error signal being routed to said first and second frequency controlling means, said loop error signal serving solely to control said first frequency controlling means and only partially to control said second frequency controlling means, said error signal serving as the control for each of said first and second frequency controlling means so that the capacitive value of each of said first and second frequency controlling means is substantially the same, and is variable over a predetermined range and provides said natural resonant frequencies that correspond to said first carrier frequency signals; and
(d) voltage-frequency control adjustment means developing said voltage frequency adjustment control signal and having a second switching means with a conductive and a non-conductive state responsive to said external signal, said voltage-frequency control adjustment means comprising:
(i) an inverting network receiving said loop error signal and providing, when in an operative state, an output signal that is phase shifted by a predetermined amount from said loop error signal; and
(ii) a bias network, connected between the output of said inverting network and the second frequency controlling means, said bias network controlling the operative and non-operative state of said inverting network, said bias network having an impedance element arranged across said second switching means, said impedance element and said bias network having selected values so that said inverting network is non-operative during the conductive state of said second switching means, said bias network, said impedance element and said inverting means further having values selected so that said second frequency controlling means is supplied with a range of said voltage-frequency adjustment control signals for causing the resonant circuit to generate said second carrier frequency signals that are shifted in frequency by a predetermined amount determined by said voltage-frequency adjustment signals and in response to said external signal.

13. A circuit arrangement according to claim 12 wherein said first and second frequency controlling means include a voltage variable capacitance diode having an anode and a cathode, and in which the capacitance values vary in a linear manner in response to reverse-bias voltages having a log-type characteristic.

14. A circuit according to claim 13 wherein said range of said voltage-frequency adjustment control signals varies in a linear manner as a log-type function and correlates to the linear capacitance variation of voltage variable capacitance diodes having reverse-bias voltages applied to the cathodes of the voltage variable diodes.

15. A modulation circuit for generating a plurality of first and second carrier frequency signals with the second carrier signal being shifted by a predetermined step in frequency from said first carrier signal in response to an external signal, each of the carrier frequency signals having a predetermined bandwidth, said modulation circuit comprising:
(a) a frequency generator having a first switching means responsive to said external signal, said frequency generator generating a first variable output signal;
(b) an oscillator responsive to said frequency generator and including a resonance circuit comprising:
(i) an inductive element having a predetermined value;
(ii) a first frequency controlling means comprising a first capacitive element and responsive to a loop error signal for varying its capacitive value over a predetermined range;
(iii) a second frequency controlling means comprising a second capacitive element and responsive to both said loop error signal and to a voltage-frequency adjustment control signal for varying its capacitance value over a predetermined range;

said resonant circuit having a total capacitive value which is the sum of the inherent capacitance of the output stage of the oscillator and said first capacitive element capacitive value as well as said second capacitive element capacitive value, said resonance circuit having a plurality of natural response frequencies corresponding to said plurality of first and second carrier frequency signals, said natural response frequencies being determined by said total capacitance value and said inductive element;
(c) a feedback control network responsive to said first variable output signal and developing said loop error signal, said loop error signal being routed to said first and second frequency controlling means, said loop error signal serving solely to control said first frequency controlling means and only partially to control said second frequency controlling means, said error signal serving as the control to each of said first and second frequency controlling means so that the capacitive value of each of said first and second frequency controlling means is substantially the same and is variable over a predetermined range and provides said natural resonant frequency signals;
(d) voltage-frequency control adjustment means developing said voltage frequency adjustment control signal and having a second switching means with a conductive and a non-conductive state responsive to said external signal, said voltage-frequency control adjustment means comprising:
(i) a frequency-control network receiving said loop error signal and providing, when in an operative state, an output signal that is phase shifted by a predetermined amount from said loop error signal; and
(ii) means for controlling the operative state of said frequency-control network and being arranged with said second switching means so that said frequency-control network is rendered operative during the non-conductive state of said second switching means, said means for controlling being connected between the output of said frequency-control network and the second frequency controlling means, said means for controlling and said frequency-control network having values selected so that said second frequency controlling means is supplied with a range of said voltage-frequency adjustment control signals for causing the resonant circuit to generate said second carrier frequency signals that are shifted in frequency by a predetermined amount determined by said voltage-frequency adjustment signals and in response to said external signal.

16. A circuit arrangement according to claim 15 wherein said first and second frequency controlling means include a voltage variable capacitance diode having an anode and a cathode, and in which the capacitance values vary in a linear manner in response to reverse-bias voltages having a log-type characteristic.

17. A circuit according to claim 16 wherein said range of said voltage-frequency adjustment control signals varies in a linear manner as a log-type function and correlate to the linear capacitance variation of the voltage variable capacitance diodes having reverse-bias voltages applied to the cathodes of the voltage variable capacitance diodes.

* * * * *